No. 733,546. PATENTED JULY 14, 1903.
G. C. GAMMELL.
CHUCK.
APPLICATION FILED NOV. 7, 1901.
NO MODEL.

WITNESSES:
John A. Rennie
Rollin Tracy

George C. Gammell,
INVENTOR

BY Rollin Tracy
ATTORNEY

No. 733,546. Patented July 14, 1903.

UNITED STATES PATENT OFFICE.

GEORGE C. GAMMELL, OF STAMFORD, CONNECTICUT.

CHUCK.

SPECIFICATION forming part of Letters Patent No. 733,546, dated July 14, 1903.

Application filed November 7, 1901. Serial No. 81,393. (No model.)

*To all whom it may concern:*

Be it known that I, GEORGE C. GAMMELL, of Stamford, in the county of Fairfield and State of Connecticut, have invented a certain new and useful Improvement in Chucks, of which the following is a specification.

My invention relates to that class of chucks wherein a plurality of loose jaws are employed to grip the various kinds of tools used by artisans and others. At the same time it may be advantageously used in connection with appropriate machines, my object being to produce a chuck of this character which shall be simple and inexpensive in construction, effective in operation, and wherein the parts are so arranged that the jaws will be automatically and positively opened and simultaneously closed.

To these ends my invention consists substantially of a chuck comprising a threaded shank or body portion having a plurality of axially-disposed pockets formed therein, jaws adapted to said pockets, means coacting with said jaws to keep them normally open, and an internally-threaded sleeve adapted to engage the threaded shank or body portion and to move thereon, whereby said jaws are moved to close upon and grip the tool.

My invention further consists of the novel features of construction and arrangement of parts, all of which will be hereinafter fully described, and particularly pointed out in the appended claim.

Figure 1:
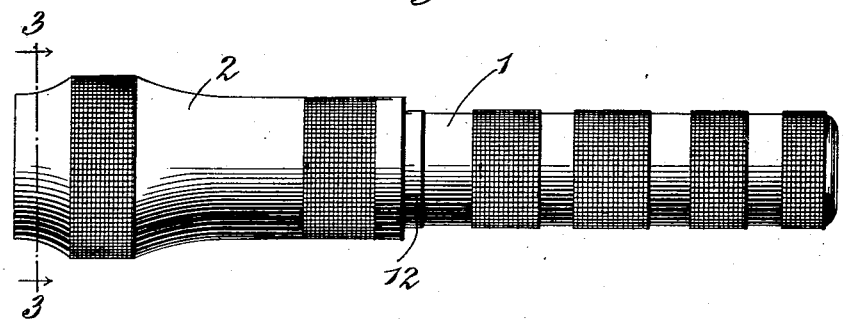
Figure 2:
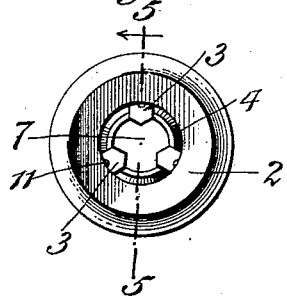
Figure 3:
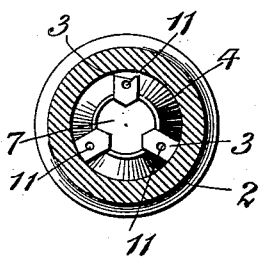
Figure 4:
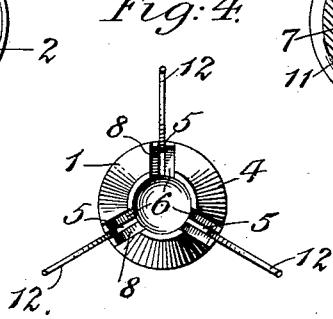
Figure 5:
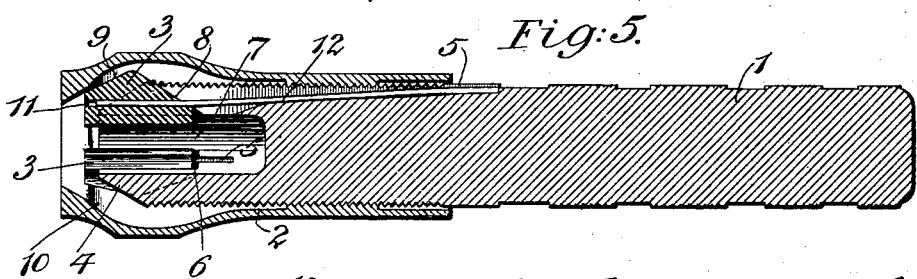
Figure 6:
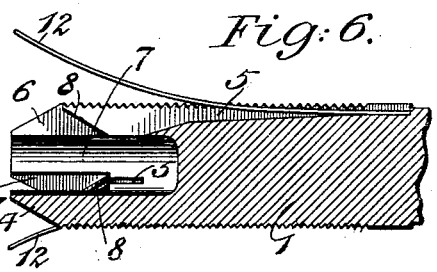

In the drawings forming part of this specification, Figure 1 represents an external view of a chuck constructed according to my invention. Fig. 2 is a front end view. Fig. 3 is a transverse section taken on the line 3 3 of Fig. 1. Fig. 4 is a front end view of the shank or body portion, the jaws being removed. Fig. 5 is a central longitudinal section taken on the line 5 5 of Fig. 2. Fig. 6 is a similar view of the forward end of the shank or body portion with the jaws removed.

Similar reference-numerals indicate corresponding parts in all the figures of the drawings.

In said drawings, 1 designates the shank or body portion of the chuck, which in this instance is made cylindrical in form, its forward end for a portion of its length being externally threaded to receive the internally-threaded portion of a sleeve or collar 2, the latter being designed to operate upon a plurality of jaws 3 to close them on the tool or other object to be gripped, as will be hereinafter described. The forward end of the shank or body portion 1, which is made tapering or conical, as represented at 4, is provided with a plurality of axially-disposed grooves 5, whose outer extremities terminate in open pockets 6, that lead into the centrally-bored or hollow end 7 of the shank 1, said pockets having their rear walls 8 inclined or tapered downwardly and rearwardly, as clearly shown in Figs. 5 and 6. The rear faces of the jaws 3 are also made tapering or inclined, as represented at 9, to approximately conform to the incline or taper of the shank 1, and rear walls 8 of the pockets 6, the latter forming appropriate bearing-surfaces for one of the inclined ends of the jaws 3, are acted upon by the internally-tapered end 10 of the sleeve or collar 2 when it is moved rearwardly on the shank to close them upon the tool or other object to be gripped, as will be apparent. Each of the jaws 3 is provided with a perforation 11, adapted to receive the outer free end of a spring 12, firmly secured in each of the grooves 5, and by reason of the tendency of these springs to press outwardly at their free ends, as clearly shown in Figs. 4 and 6, said jaws will at all times be held in positive engagement with the rear inclined walls of the pockets 6, although they are free to move lengthwise on said springs as they open and close, and when the collar or sleeve 2 has been rotated to release said jaws it will be apparent that they will automatically move away from each other, so as to readily admit of the insertion between them of the desired tool or other object to be gripped.

In the operation of my invention the sleeve or collar 2 will first be rotated so as to move its internally-tapered end along the inclined rear faces of the jaws 3 to a more or less extent, which will permit the jaws 3 through the agency of the springs 12 to be simultaneously forced apart as well as permitting them to move forwardly along the inclined rear walls 8 of the pockets 6 ready to receive the object to be gripped, after which said sleeve will be rotated in the opposite direction to act upon the jaws to close them, as previously described.

It will be apparent that the side walls of the pockets 6 will serve to keep the jaws firmly in their relative positions and give a steady grip upon the tool or other object, and while I have shown three jaws and their adjuncts it is evident that the number may be lessened or increased at will without materially departing from the spirit and intent of my invention. This and other modifications of my invention may be made, and I reserve the right to make such changes as may be held to fairly fall within its scope of the insertion between them of the desired tool or other object to be gripped.

In the operation of my invention the sleeve or collar 2 is rotated so as to move its internally-tapered end along the inclined rear faces of the jaws 3 to a more or less extent. The said jaws will then through the agency of the springs 12 be simultaneously forced away from each other and will move outwardly along the inclined rear walls of the pockets 6.

Having thus described my invention, what I claim, and desire to secure by Letters Patent, is as follows:

In a chuck of the character described, the combination with the exteriorly-threaded body portion 1 having axially-disposed grooves 5 whose outer extremities terminate in the open pockets 6, said pockets having inclined walls 8, internally-threaded sleeve 2 operatively mounted on said body and having the internally-tapered end or mouth 10, which tapered end corresponds substantially to the inclined walls of said pockets, of the jaws 3 having straight gripping-faces and forward and rearward inclined backs, said forward and rearward inclinations being substantially the same, and adapted to conform to the inclined walls of the pockets in said body and the inclined or tapered portions 10 of said sleeve, springs secured by one end to said body, said jaws having a hole longitudinally therethrough and adapted thereby to be loosely mounted on the free end of said springs so that, by means of said inclinations on said body, sleeve and jaws, and the free longitudinal movement of the jaws on said springs, the gripping-faces will always be parallel with each other whether said jaws are in an open or closed position, substantially as shown and described.

GEORGE C. GAMMELL.

Witnesses:
MARTIN J. GRAY,
ROLLIN TRACY.